United States Patent
Bethel

(10) Patent No.: US 7,063,516 B2
(45) Date of Patent: Jun. 20, 2006

(54) ONE-WAY VALVE

(75) Inventor: Brian V. Bethel, Corona, CA (US)

(73) Assignee: Wilden Pump and Engineering LLC, Grand Terrace, CA (US)

(*) Notice: Subject to any disclaimer, the term of this patent is extended or adjusted under 35 U.S.C. 154(b) by 44 days.

(21) Appl. No.: 10/839,749

(22) Filed: May 4, 2004

(65) Prior Publication Data
US 2005/0249621 A1 Nov. 10, 2005

(51) Int. Cl.
F04B 43/06 (2006.01)
F16K 21/04 (2006.01)

(52) U.S. Cl. .............. 417/395; 251/361; 137/533.11; 137/533.15

(58) Field of Classification Search ............ 417/395; 251/361; 137/527.8, 533.11, 533.15, 533.21
See application file for complete search history.

(56) References Cited

U.S. PATENT DOCUMENTS

| | | | | |
|---|---|---|---|---|
| 2,018,769 A | * | 10/1935 | Tryon ............... | 137/515.7 |
| 3,356,036 A | * | 12/1967 | Repp ............... | 417/559 |
| 4,247,264 A | | 1/1981 | Wilden ............. | 417/393 |
| 4,549,467 A | | 10/1985 | Wilden et al. ...... | 417/395 |
| 4,623,303 A | * | 11/1986 | Henderson ......... | 417/238 |
| 5,169,296 A | | 12/1992 | Wilden ............. | 417/395 |
| 5,213,485 A | | 5/1993 | Wilden ............. | 417/393 |
| 5,957,670 A | | 9/1999 | Duncan ............ | 417/395 |
| 6,168,394 B1 | * | 1/2001 | Forman et al. ..... | 417/395 |
| RE38,239 E | | 8/2003 | Duncan ............ | 417/395 |

* cited by examiner

Primary Examiner—Charles G. Freay
(74) Attorney, Agent, or Firm—Connolly Bove Lodge & Hutz LLP

(57) ABSTRACT

A double diaphragm pump including an air manifold, two air chambers to either side of the air manifold, two pump chambers to either side of the air chambers and diaphragms extending between the air chambers and pump chambers are stacked together in horizontal assembly. Intake and discharge manifolds span this distance to intake and exhaust ports associated with the pump chambers. One-way valves having valve bodies with passages therethrough are arranged between the manifolds and the pump chambers. The valve bodies have inlet mounting surfaces and outlet mounting surfaces with circular attachment flanges radially extending from these mounting surfaces. The circular attachment flanges each define a central axis which on each valve body are parallel and laterally displaced from one another. Concavities extend inwardly from the valve bodies from the inlet and outlet mounting surfaces. The angle between the central axis in the direction of the adjacent mounting surface and the surface of either concavity is acute and does not exceed approximately 60°.

31 Claims, 3 Drawing Sheets

ONE-WAY VALVE

BACKGROUND OF THE INVENTION

The field of the present invention is one-way valves and pumps employing such valves.

One-way valves are typically simple mechanisms including a passage, a valve seat within that passage and a valve element capable of sealing with the valve seat. The valve element in the simplest of such devices often is defined by a ball, a hinged flap or a "mushroom". The mushroom is commonly at least a portion of a ball on the end of a shaft with the shaft being slidably mounted coaxially with the centerline of the valve seat. Such elements are typically actuated by pressure and flow with resistance to opening provided by gravity, back pressure and/or resilient elements.

The mounting of such one-way valves, because of their simplicity, frequently reflect the structures with which they are associated. Where such valves are separate subassemblies, radially extending mounting flanges about the ends of the valve passage are common. Such flanges mate with like flanges on associated equipment and are held in place by conventional mechanisms such as band clamps and bolts. Because of the simplicity of one-way valves, they are frequently incorporated into the body of the adjacent apparatus.

Air driven double diaphragm pumps provide one example of a major use of one-way valves. Such pumps include a central air manifold and air valve, air chambers to either side of the air manifold and pump chambers to either side of the air chambers. Diaphragms are placed between the air chambers and pump chambers to complete the horizontal stack of components. Two one-way valves are associated with each pump chamber, an intake valve oriented below and an exhaust valve oriented above the pump chamber. The pump chamber defines passageways with which valve elements and valve seats are placed. Mounting flanges are located at the intake port before the intake one-way valve and at the terminus of the exhaust port after the one-way exhaust valve. Again, clamp bands or bolts are employed to associate the mounting flanges with intake and exhaust piping.

Of particular interest with air driven diaphragm pumps arranged in a horizontal stack as described above, intake and exhaust manifolds are associated with the pumps and span across the pump to the corresponding intake/exhaust ports. Care must be taken in the parts selection and assembly of such devices because the stack as measured between the corresponding ports on either end thereof has a cumulative tolerance which can cause misalignment of the manifold mounting flanges with the port mounting flanges. In conventional pumping applications, such possible mismatches are considered tolerable unless so great that the seal is ineffective and results in leakage.

The aforementioned air driven double diaphragm pumps have been experiencing more and more utility in food processing and other processing operations which require a very clean environment. With food processing, design challenges can be compounded because the food itself becomes a contaminant with time. Consequently, even the pumped material is to be periodically eliminated from the pump environment. These requirements dictate proper sealing and the elimination of quiescent areas in flow streams. As a result, the misalignment mentioned above, tolerable in most circumstances, becomes less tolerable in such applications as food processing where such misalignments can cause small quiescent areas and small cavities in the joints between components. Further, to insure ultimate ability to clean all components, the one-way valves on sanitary equipment are more typically removable rather than integrally formed with the pump cavities.

SUMMARY OF THE INVENTION

The present invention is directed to one-way valves and separately to double diaphragm pumps employing such valves. Each valve includes a valve body having a passage therethrough. There are mounting surfaces about the passage at either end thereof with radially extending circular attachment flanges.

In a first separate aspect of the present invention, the foregoing valve further includes a valve element which is a non-hinged element that rests on a seat defined in the passage. Non-hinged elements are of particular utility for sanitary devices as these mechanisms lack areas of quiescence within the product flow stream. The circular flanges define central axes with those axes being parallel to and displaced laterally from each other. The lateral displacement of the axes defined by the circular attachment flanges allows the two valve bodies to be rotated to specifically accommodate the misalignment of components due to cumulative tolerance variations in equipment assemblies.

In a second separate aspect of the present invention, the one-way valve includes circular attachment flanges defining axes which are offset and of equal diameter. These mounting flanges are, therefore, able to accommodate cumulative tolerance variations and additionally be universally applicable for both intake and exhaust applications in the same equipment.

In a third separate-aspect of the present invention, circular flanges define displaced central axes and accommodate cumulative tolerance variations. The passage extending between the mounting surfaces defines two concavities from the mounting surfaces. All surfaces of the concavities form acute angles with the central axes in the direction of the adjacent mounting surface. These features provide the ability to eliminate quiescent areas in flow through the valve and avoid easily contaminated conditions. In details which may be included with this separate aspect of the present invention, the acute angle may be limited to no greater than 60°, the diameters of the circular attachment flanges may be equal and/or the valve element may be a ball.

In a fourth separate aspect of the present invention, a pump having two pump chambers, a manifold in communication with each of the pump chambers and two one-way valves includes circular attachment flanges on the valves defining laterally displaced central axes. In the pump, the passage defines two concavities with all surfaces of the concavities forming acute angles with the central axes in the direction of the adjacent mounting surface. In this separate aspect, these specific features advantage assembly of such one-way valves with a pump and pump manifold.

In a fifth separate aspect of the present invention, the fourth separate aspect is further contemplated to be employed with a double diaphragm pump with an air manifold and two air chambers with diaphragms between the air and pump chambers. The use of the valve arrangement accommodating cumulative tolerance variations provides even greater value.

In a sixth separate aspect of the present invention, any of the foregoing separate aspects may be employed together to greater advantage.

Accordingly, it is an object of the present invention to provide an improved one-way valve. Other and further objects and advantages will appear hereinafter.

DETAILED DESCRIPTION OF THE PREFERRED EMBODIMENTS

Figure 1:
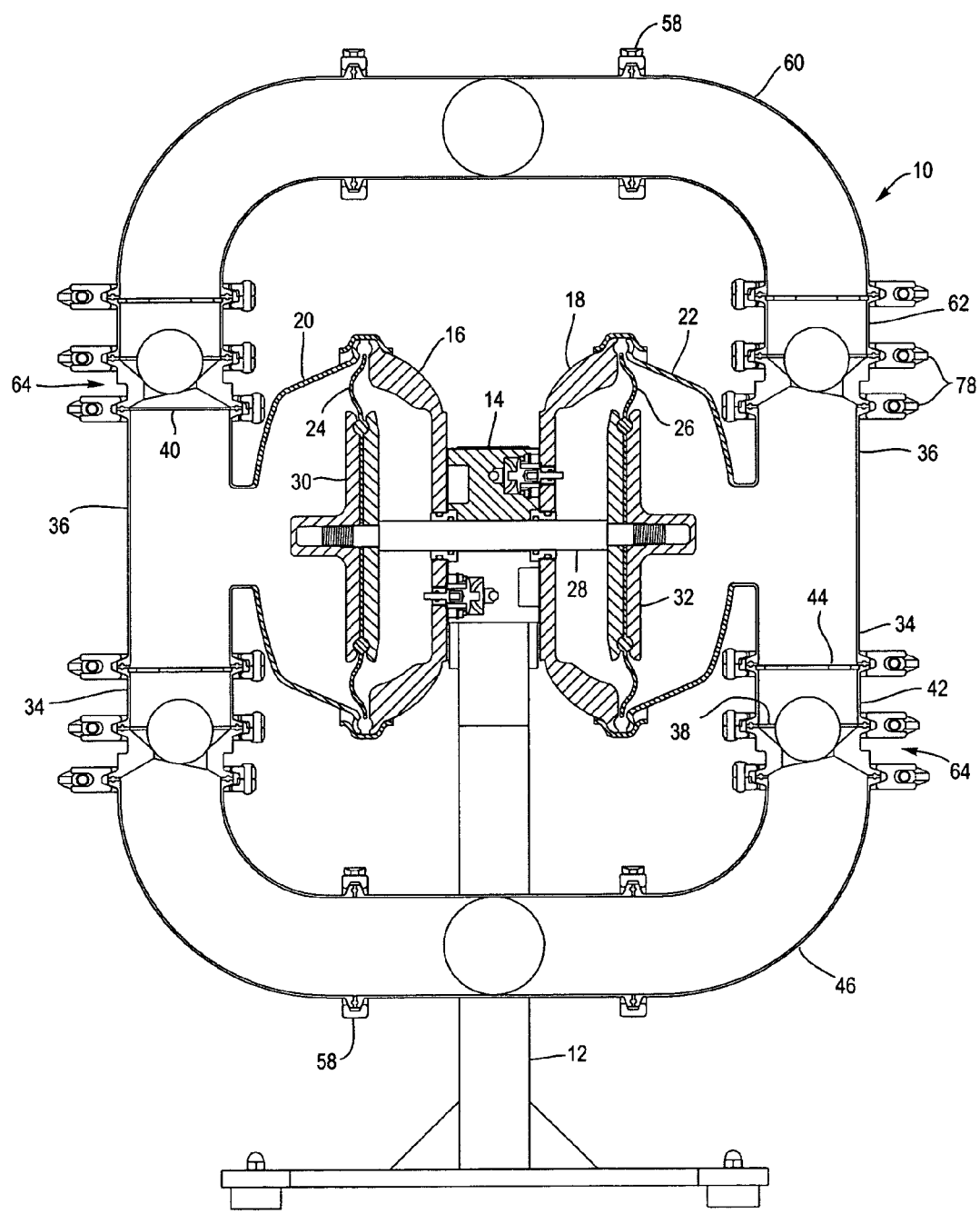
FIG. 1 is a schematic cross section of an air drive double diaphragm pump.

Turning in detail to the Figures, an air driven double diaphragm pump, generally designated 10, is illustrated supported on a stand 12. The pump includes an air manifold 14 flanked by air chambers 16, 18. Pump chambers 20, 22 are positioned outwardly about the air chambers 16, 18. Diaphragms 24, 26 are held in place between the air chambers 16, 18 and the pump chambers 20, 22 by the assembly of these components. A common shaft 28 extending between pistons 30, 32 ties the diaphragms 24, 26 together.

Prior air driven double diaphragm pumps and actuator valves are illustrated in U.S. Pat. Nos. 5,957,670; 5,213,485; 5,169,296; 4,549,467; and 4,247,264. The foregoing patents are incorporated herein by reference. Another mechanism to drive an actuator valve is by solenoid such as disclosed in U.S. Pat. No. RE 38,239.

The pump chambers 20, 22 have intake ports 34 and exhaust ports 36. These ports 34, 36 include mounting surfaces with circular attachment flanges 38, 40 which radially extend from the ports in a conventional arrangement.

The intake ports 34 each include a separate cylindrical component 42 which is mounted by attachment flanges to the main body of the pump chamber 20, 22. The use of this component 42 accommodates a stop 44 located at the break between the component 42 and the pump chamber 20, 22. The stop 44 is employed with a ball valve element. If a mushroom valve element is employed, the stop further includes a socket to receive the shaft of the mushroom. No stop is necessary for a flap valve element.

Figure 2:
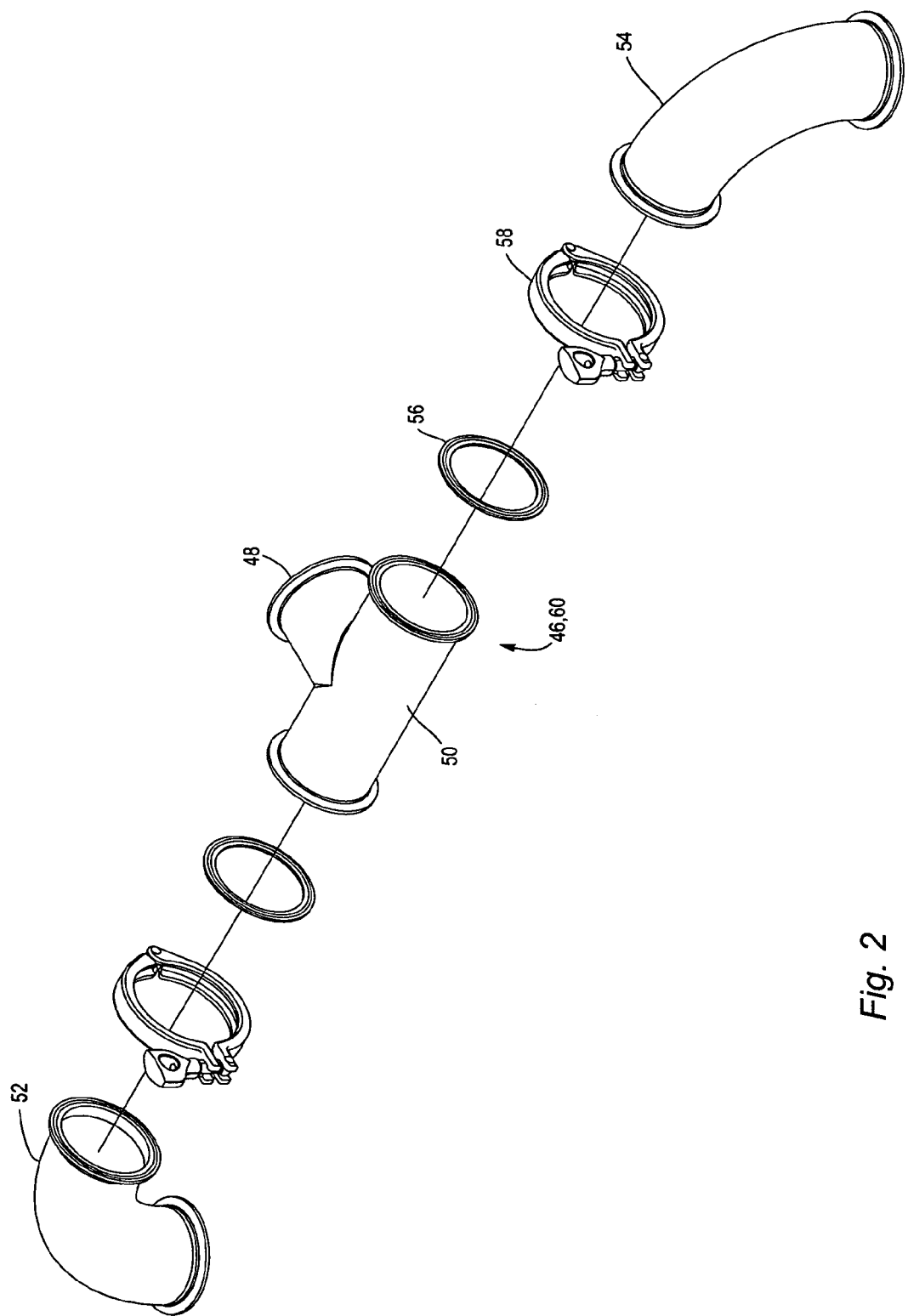
FIG. 2 is an exploded assembly view in perspective of a pump manifold.
Figure 3:
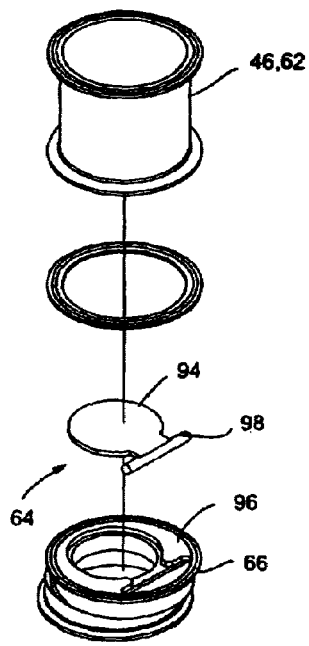
FIG. 3 is an exploded assembly view in perspective of a one-way valve with a flap valve element.
Figure 4:
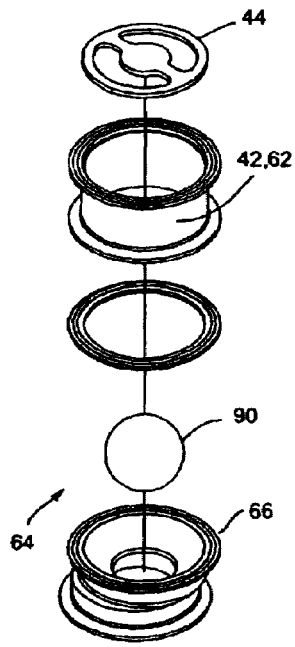
FIG. 4 is an exploded assembly view in perspective of a one-way valve with a ball valve element.
Figure 5:
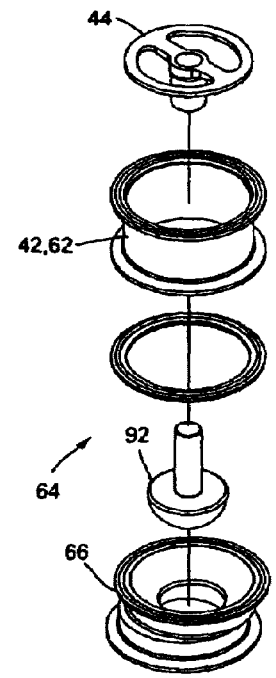
FIG. 5 is an exploded assembly view in perspective of a one-way valve with a mushroom valve element.

An intake manifold 46 is constructed as seen in FIG. 2. The manifold includes an inlet 48 which is part of a T-fitting 50. Elbows 52, 54 extend from the T-fitting to define a substantially U-shaped structure. Gaskets 56 and band clamps 58 complete the assembly. The outer ends of the elbows 52, 54 of the intake manifold 46 are affixed to one-way valves to be in communication with the pump chambers 20, 22.

A discharge manifold 60 is placed in communication with the pump chambers 20, 22 through the exhaust ports 36. In the case of the discharge manifold 60, it again appears identical to the intake manifold illustrated in FIG. 2 with the exception that cylindrical components 62 are associated with the ends of the elbows. These cylindrical components 62 are separate from the elbows to accommodate stops as was true of the intake ports 34 of the pump chambers 20, 22.

Figure 6:
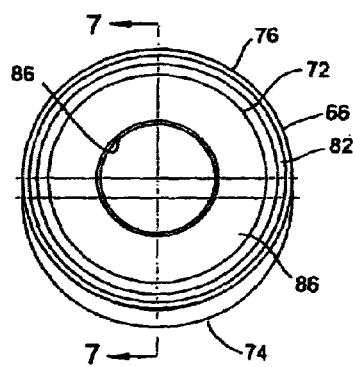
FIG. 6 is a plan view of a one-way valve housing employed for a ball or mushroom valve element.
Figure 7:
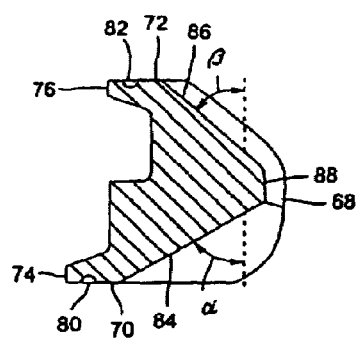
FIG. 7 is a cross-sectional view taken along line 7—7 of FIG. 6.

Turning to the one-way valves, generally designated 64, reference is particularly made to FIGS. 6 and 7 illustrating the valve body 66. The valve body is generally circular in form and has a passage 68 therethrough. The valve body 66 includes parallel mounting surfaces 70, 72. These mounting surfaces 70, 72 extend about the ends of the passage 68 and radially extend to circular attachment flanges 74, 76. The shape of the attachment flanges 74, 76 is conventional to accommodate a band clamp 78. Sealing grooves 80, 82 are provided on the mounting surfaces 70, 72.

The circular attachment flanges 74, 76 define central axes by the geometry of the periphery thereof. These central axes extend perpendicular to the mounting surfaces 70, 72. The defined axes are parallel and are displaced laterally from one another, reflecting lateral displacement of the flanges 74, 76 themselves. In the preferred embodiment, the axes are laterally displaced by 0.275 inches. The outer diameters of the attachment flanges 74, 76 are equal and are approximately 3.6 inches in this embodiment. The valve body 66 is 1.4 inches high.

The valve passage 68 includes an inlet concavity 84 from the mounting surface 70. This concavity 84 is conveniently conical but may take on any advantageous concave shape. The angle of the concavity is constant, given its conical shape but may be defined by a compound curve in which the angle varies. The surface of the concavity forms an acute angle with the central axis of the concavity measured in the direction toward the adjacent mounting surface forming the angle $\alpha$. The acute angle is approximately 60°. This conical surface on the inlet concavity 84 extends directly from the mounting surface 70. Were the angle of any part of the surface of the concavity to approach 90° to the central axis in the direction of the adjacent mounting surface 70, quiescent areas in the flow would be experienced. Such areas, not being subjected to sufficient replacement flow, can create an area where product being pumped stagnates. This can be disadvantageous, particularly in food processing environments.

The valve passage 68 also includes an outlet concavity 86 which extends inwardly from the mounting surface 72 at the outlet end of the one-way valve 64. This concavity 86 is also conveniently conical but may take on any concave shape to best provide a seal for the type and size of the associated valve element. FIGS. 6 and 7 represent an embodiment suited for a ball valve or a mushroom valve. The conical surface defined within the concavity 86 forms an angle $\beta$ between the central axis defined by the surrounding attachment flange 76 extending in the direction of the outlet mounting surface 72 and the surface of the concavity which is approximately 48°.

Between the inlet concavity 84 and the outlet concavity 86, a cylindrical section 88 joins the two conical surfaces. With the cylindrical section 88 and the inlet and outlet concavities 84 and 86, the passage 68 extends from the inlet mounting surface 70 to the outlet mounting surface 72. To insure maximum longevity and performance from the valve element, the intersection between the outlet concavity 86 and the cylindrical section 88 is radiused to avoid a sharp edge.

Three valve elements, a ball valve element 90, a mushroom valve element 92 and a flap valve element 94 are illustrated. The non-hinged elements, an untethered ball 90 and an axially slidable mushroom valve element 92 are more easily incorporated when the elimination of all quiescent flow areas is of interest. The flap typically, but not necessarily, is flat and is employed with a flat seat 96. The hinge 98 along with the flat seat can cause quiescent areas where pumped material can accumulate and stagnate. The non-hinged elements such as the ball valve element 90 and the mushroom valve element 92 accommodate a conical seat defined by a portion of the outlet concavity 86.

Integrating the valve housing in the assembly of a pump 10, these stacked components to the outer pump chambers 20, 22 are assembled. This assembly provides a certain nominal distance modified by accumulated tolerances. As the intake and discharge manifolds 46 and 60 have fixed ports, the ports of the manifolds and the spaced intake ports 34 and exhaust ports 36 may not exactly align. In this circumstance, the valve bodies 66 are rotated until alignment is achieved through these valve bodies. Band clamps then lock the several components in place. The intersection of the concavities 84 and 86 with the mounting surfaces 70 and 72 define an opening plane of specific and equal diameters. The components of the pump and manifolds have matching diameters and noninvasive seals to again eliminate any small cavity or overhang which can stagnate flow. The application of the band clamps will tend to further center these components to eliminate any discontinuous surface feature between mated components.

Finally, each one-way valve 64 can be employed at either end of either the inlet manifold 46 or discharge manifold 60. Consequently, one one-way valve design may be applied four times in the assembly of such a pump 10.

Thus, an improved one-way valve and the application thereof have been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A one-way valve comprising
   a valve body including an inlet mounting surface, an outlet mounting surface, a passage extending between the mounting surfaces and two circular attachment flanges radially extending from the mounting surfaces, the circular attachment flanges each defining a central axis, the central axes being parallel to and displaced laterally from each other, the passage defining two concavities from the mounting surfaces with the surface of each concavity always forming an acute angle with the central axes in the direction of the mounting surface adjacent the concavity;
   a valve element positioned to rest in the concavity which is adjacent the outlet mounting surface.

2. The one-way valve of claim 1, each of the concavities being conical.

3. The one-way valve of claim 1, the passage further defining a cylindrical section extending between the concavities.

4. The one-way valve of claim 1, the diameters of the circular attachment flanges being equal.

5. The one-way valve of claim 1, the acute angle being no greater than about 60°.

6. The one-way valve of claim 1, the valve element being a ball.

7. The one-way valve of claim 1, the valve element being a mushroom valve element.

8. The one-way valve of claim 1, the valve element being a flap valve element pivotally mounted to the valve body.

9. The one-way valve of claim 1, the passage including no surfaces creating quiescent areas in flow through the passage.

10. A pump comprising
    two pump chambers;
    a manifold in communication with each of the pump chambers;
    two valve bodies positioned between the manifold and the pump chambers, respectively, and each including an inlet mounting surface, an outlet mounting surface for mounting between the respective pump chamber and manifold, a passage extending between the mounting surfaces and two circular attachment flanges radially extending from the mounting surfaces, the circular attachment flanges each defining a central axis, the central axes being parallel to and displaced laterally from each other, the passage defining two concavities from the mounting surfaces with the surface of each concavity always forming an acute angle with the central axes in the direction of the mounting surface adjacent the concavity;
    valve elements positioned to rest in the concavities which is adjacent the outlet mounting surface.

11. The pump of claim 10, the manifold being a discharge manifold.

12. The pump of claim 10, the manifold being an inlet manifold.

13. The pump of claim 10 further comprising
    band clamps about the circular attachment flanges.

14. The pump of claim 10, each of the concavities being conical.

15. The pump of claim 10, the passage further defining a cylindrical section extending between the concavities.

16. The pump of claim 10, the diameters of the circular attachment flanges being equal.

17. The pump of claim 10, the acute angles being no greater than about 60°.

18. The pump of claim 10, the valve elements each being a ball.

19. The pump of claim 10, the valve elements each being a mushroom valve element.

20. The pump of claim 10, the valve elements each being a flap valve element pivotally mounted to the valve bodies, respectively.

21. The pump of claim 10, the passages including no surfaces creating quiescent areas in flow through the passages.

22. A double diaphragm pump comprising
    an air manifold;
    two air chambers, the air manifold being between the two air chambers;
    two pump chambers, the two air chambers being between the two pump chambers, the pump chambers each having an intake port and an exhaust port, each port having a circular attachment flange radially extending from the port;
    diaphragms between the pump chambers and the air chambers, respectively;
    an inlet manifold including two inlet manifold ports in communication with the pump chamber intake ports, each inlet manifold port having a circular attachment flange radially extending from the inlet manifold port and an inlet to the inlet manifold in communication with the inlet manifold ports;
    a discharge manifold including two discharge manifold ports in communication with the pump chamber exhaust ports, each discharge manifold part having a circular attachment flange radially extending from the discharge manifold part and a discharge from the discharge manifold in communication with the discharge manifold ports;

four valve bodies positioned between the manifold and the pump chambers, respectively, and each including an inlet mounting surface, an outlet mounting surface for mounting between the respective pump chamber and manifold, a passage extending between the mounting surfaces and two circular attachment flanges radially extending from the mounting surfaces, the circular attachment flanges each defining a central axis, the central axes being parallel to and displaced laterally from each other, the passage defining two concavities from the mounting surfaces with the surface of each concavity always forming an acute angle with the central axes in the direction of the mounting surface adjacent the concavity;

valve elements positioned to rest in the concavities which is adjacent the outlet mounting surface.

23. The double diaphragm pump of claim 22 further comprising band clamps about mating palm of the circular attachment flanges.

24. The double diaphragm pump of claim 22, each concavity being conical.

25. The double diaphragm pump of claim 22, each passage further defining a cylindrical section extending between the concavities.

26. The double diaphragm pump of claim 22, the diameters of the circular attachment flanges being equal.

27. The double diaphragm pump of claim 22, the acute angles being no greater than about 60°.

28. The double diaphragm pump of claim 22, each valve element being a ball.

29. The double diaphragm pump of claim 22, each valve element being a mushroom valve element.

30. The double diaphragm pump of claim 22, each valve element being a flap valve element pivotally mounted to one of the valve bodies, respectively.

31. The double diaphragm pump of claim 22, the passages including no surfaces creating quiescent areas in flow through the passages.

* * * * *

UNITED STATES PATENT AND TRADEMARK OFFICE
CERTIFICATE OF CORRECTION

| | |
|---|---|
| PATENT NO. | : 7,063,516 B2 |
| APPLICATION NO. | : 10/839749 |
| DATED | : June 20, 2006 |
| INVENTOR(S) | : Bethel, Brian V. |

It is certified that error appears in the above-identified patent and that said Letters Patent is hereby corrected as shown below:

(Col. 6, II. 63), delete "part" and insert therefor -- port --.

(Col. 6, II. 65), delete "part" and insert therefor --port --.

(Col. 7, I. 18), delete "palm" and insert therefor --pairs --.

Signed and Sealed this

Nineteenth Day of September, 2006

JON W. DUDAS
*Director of the United States Patent and Trademark Office*